Figure 1:
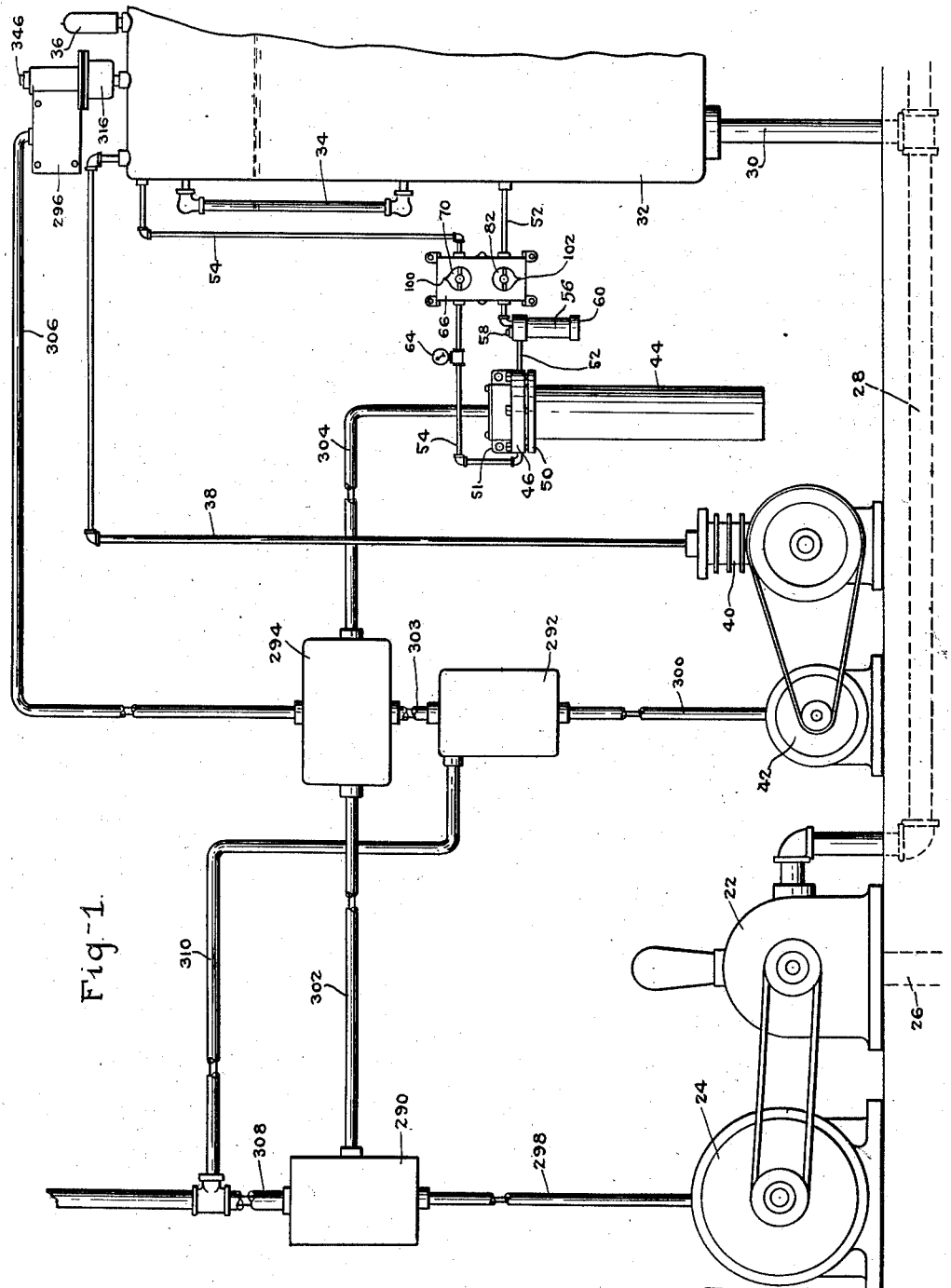

Nov. 6, 1934.    T. F. PIKE    1,979,407
HYDROPNEUMATIC CONTROL APPARATUS
Filed July 27, 1931    8 Sheets-Sheet 1

Inventor:
T. F. Pike.
By Whiteley and Ruckman
Attorneys.

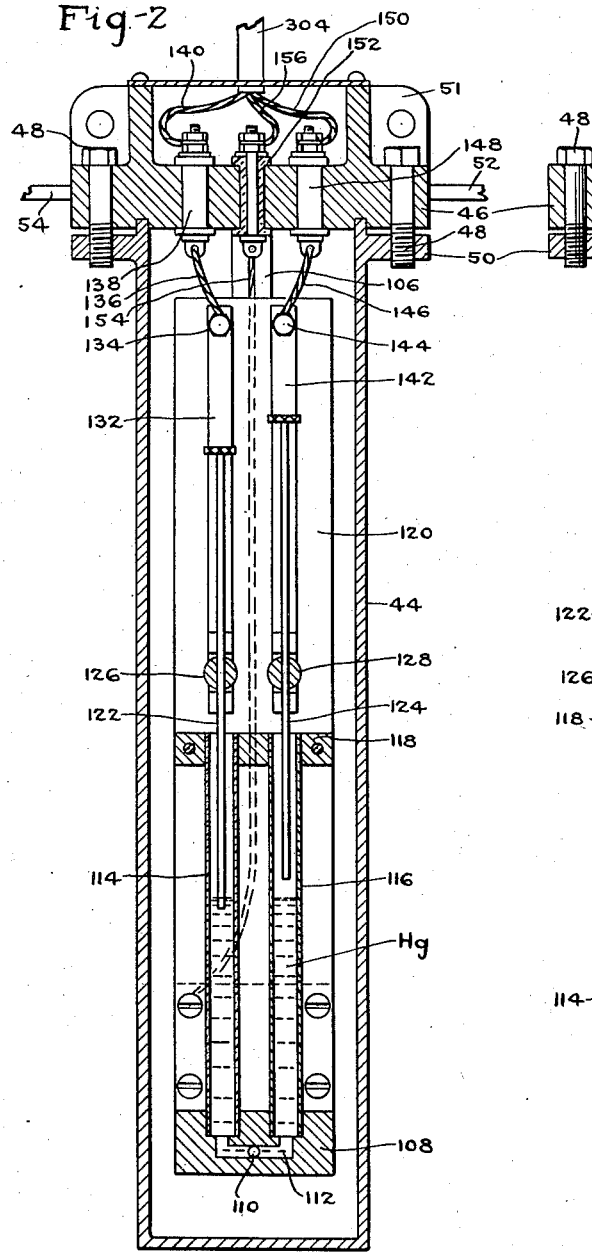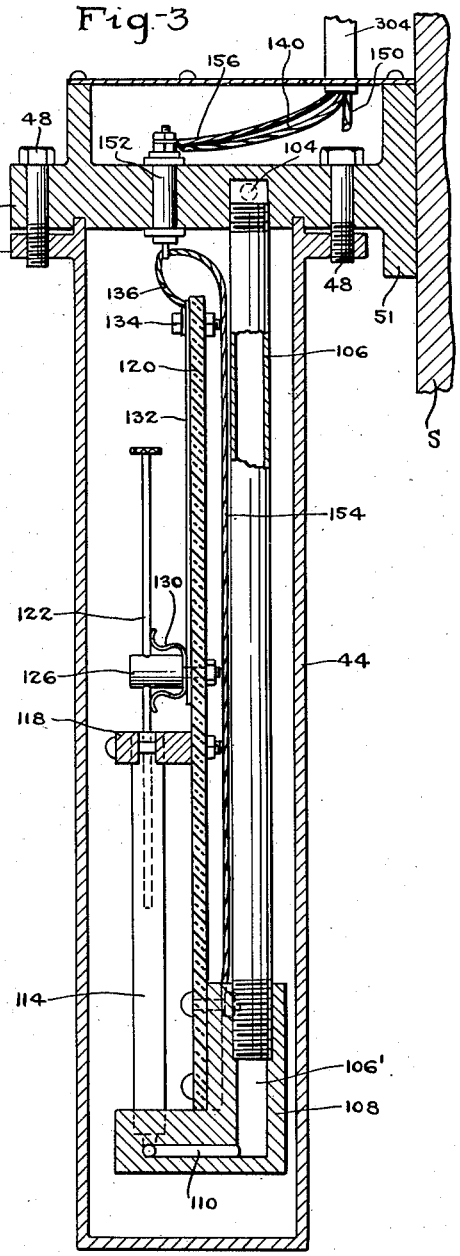

Nov. 6, 1934.  T. F. PIKE  1,979,407
HYDROPNEUMATIC CONTROL APPARATUS
Filed July 27, 1931  8 Sheets-Sheet 3
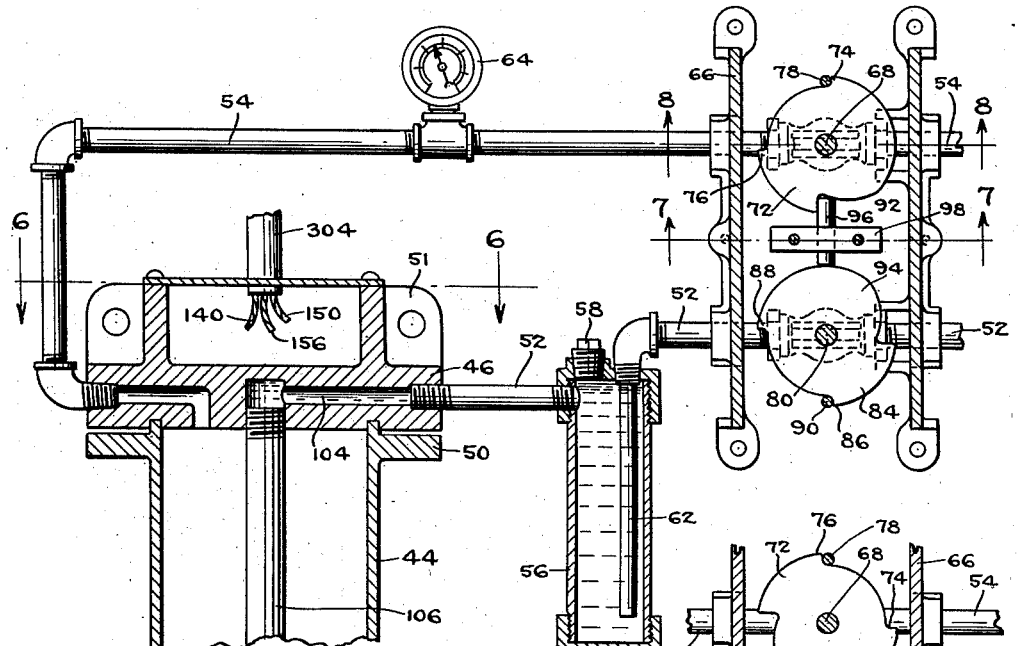
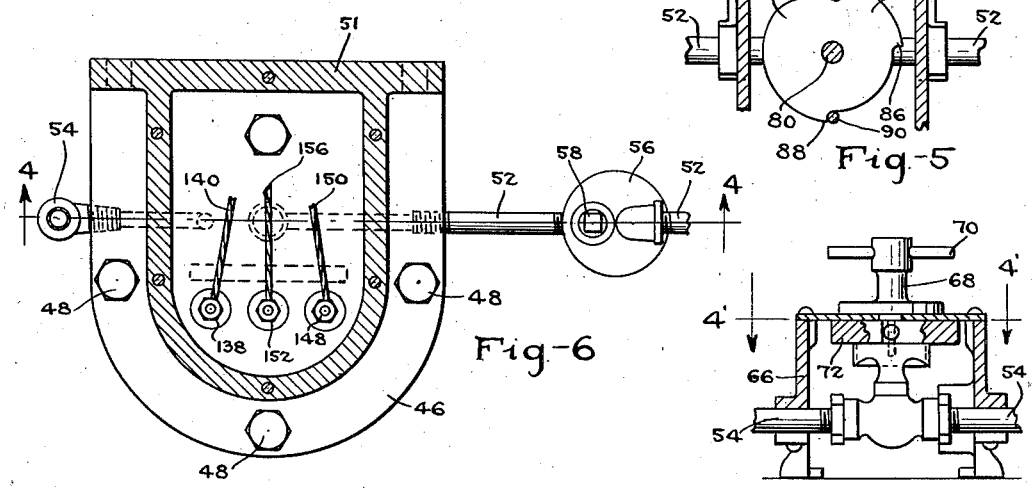
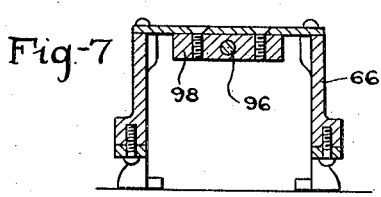
Inventor:
T. F. Pike.
By Whiteley and Ruckman
Attorneys.

Nov. 6, 1934.    T. F. PIKE    1,979,407
HYDROPNEUMATIC CONTROL APPARATUS
Filed July 27, 1931    8 Sheets-Sheet 4

Inventor:
T. F. Pike.
By Whiteley and Ruckman
Attorneys.

Nov. 6, 1934.    T. F. PIKE    1,979,407
HYDROPNEUMATIC CONTROL APPARATUS
Filed July 27, 1931    8 Sheets-Sheet 6

Inventor:
T. F. Pike.
By Whiteley and Ruckman
Attorneys.

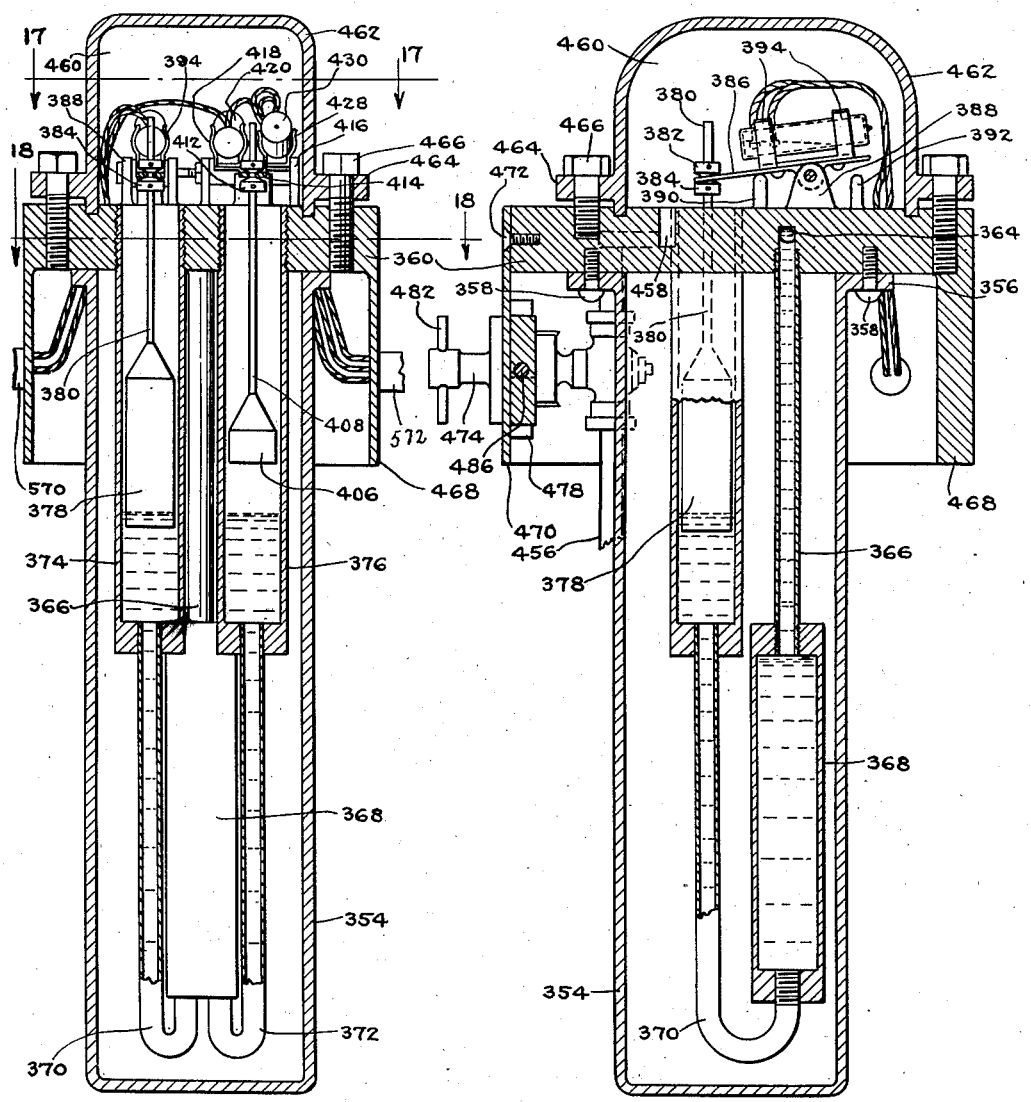

Nov. 6, 1934.  T. F. PIKE  1,979,407
HYDROPNEUMATIC CONTROL APPARATUS
Filed July 27, 1931   8 Sheets-Sheet 8

Inventor
T. F. Pike.
By Whiteley
and
Ruckman
Attorneys.

Patented Nov. 6, 1934

1,979,407

UNITED STATES PATENT OFFICE 1,979,407

HYDROPNEUMATIC CONTROL APPARATUS

Theodore F. Pike, Minneapolis, Minn., assignor to Water Level Controls Company, St. Paul, Minn., a corporation Application July 27, 1931, Serial No. 553,365

4 Claims. (Cl. 137—79)

My invention relates to hydro-pneumatic control apparatus. An object of the invention is to provide for automatically controlling the level of liquid such as water in a storage tank, and also to automatically control the pressure of air in the upper portion of the tank. The pressure of air in the tank furnishes an effective head for the water or other liquid so that it is forced through a distributing system. In carrying out my invention, I provide a mercury column device in the nature of a U-tube, one end of which is connected by a water pipe line to the lower portion of the tank below the low water level and the other end of which is connected by an air pipe line to the top of the tank. A motor driven pump for water is connected to the bottom of the tank, and a motor driven air compressor is connected to the top of the tank. The pressure on the end of the mercury column device connected to the lower portion of the tank equals the air pressure within the tank plus the pressure produced by the depth of water. The pressure on the other end is the same as the air pressure in the tank. Since the mercury column counterbalances the water in the tank, any change in the depth of the water causes a corresponding change in the position of the mercury column. This change is utilized to make and break electric circuits controlling an automatic motor starter. Since the water levels in the tank are maintained within certain predetermined limits, I have found it possible to accurately control the air pressure by means of an air pressure switch used in connection with the stop device for the water pump.

The full objects and advantages of my invention will appear in connection with the detailed description thereof, and the novel features of my inventive idea will be particularly pointed out in the claims.

Figure 9:
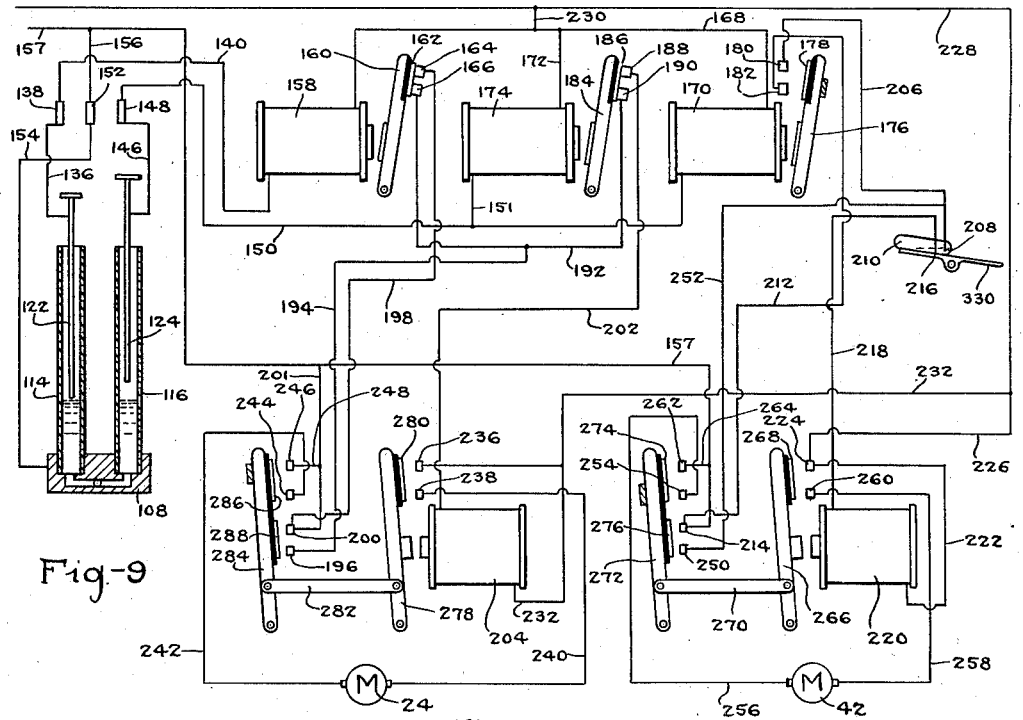
Figure 10:
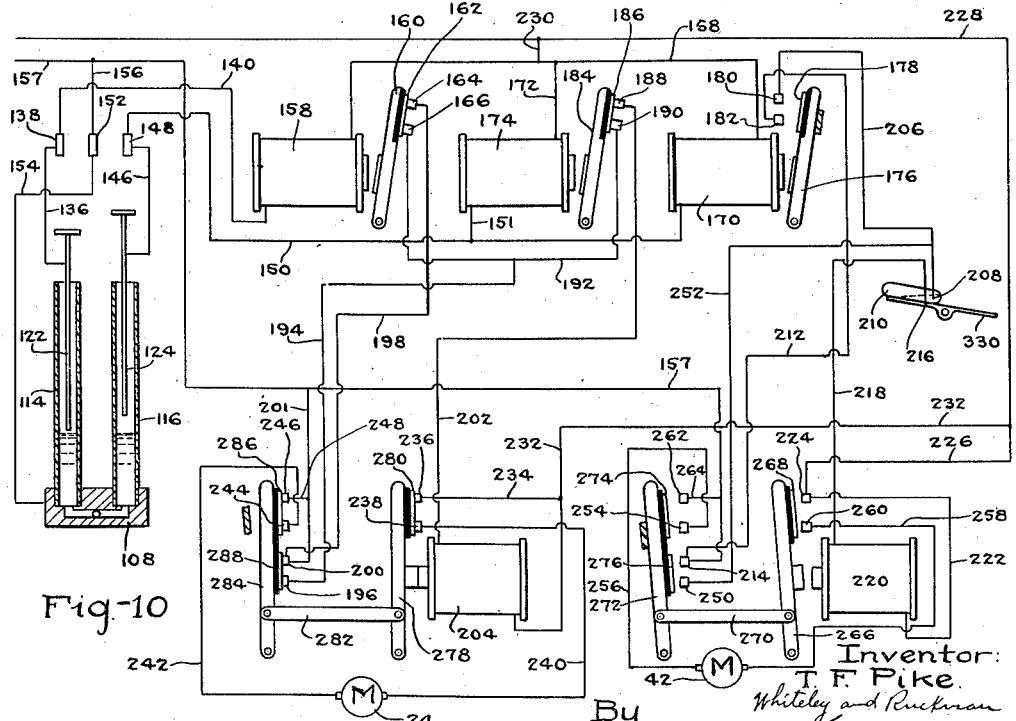
Figure 11:
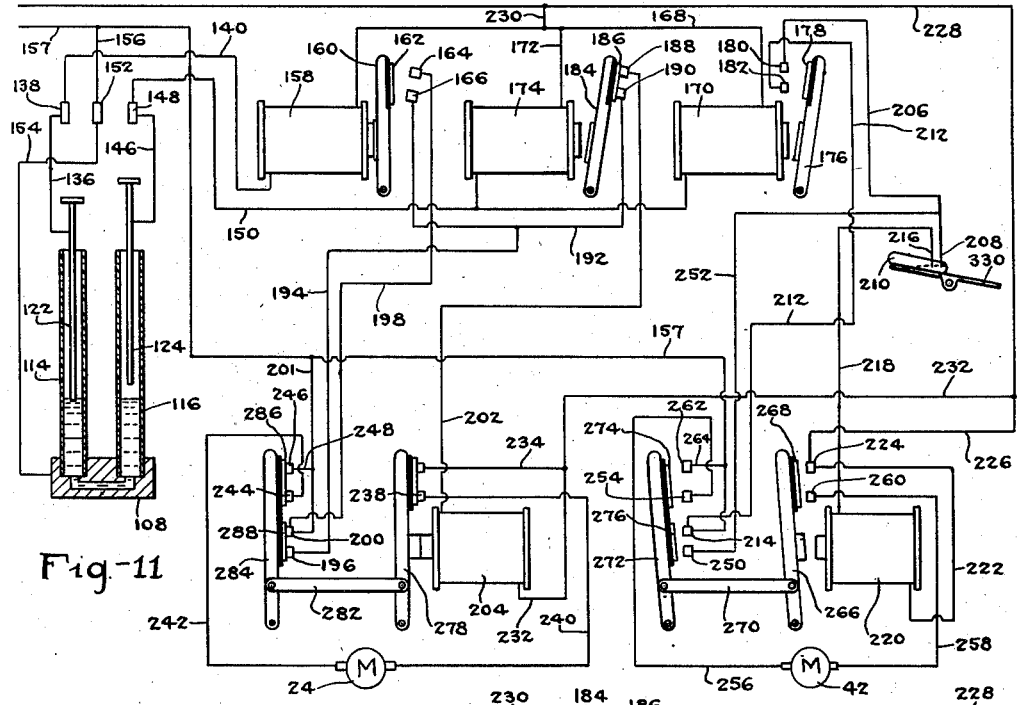
Figure 12:
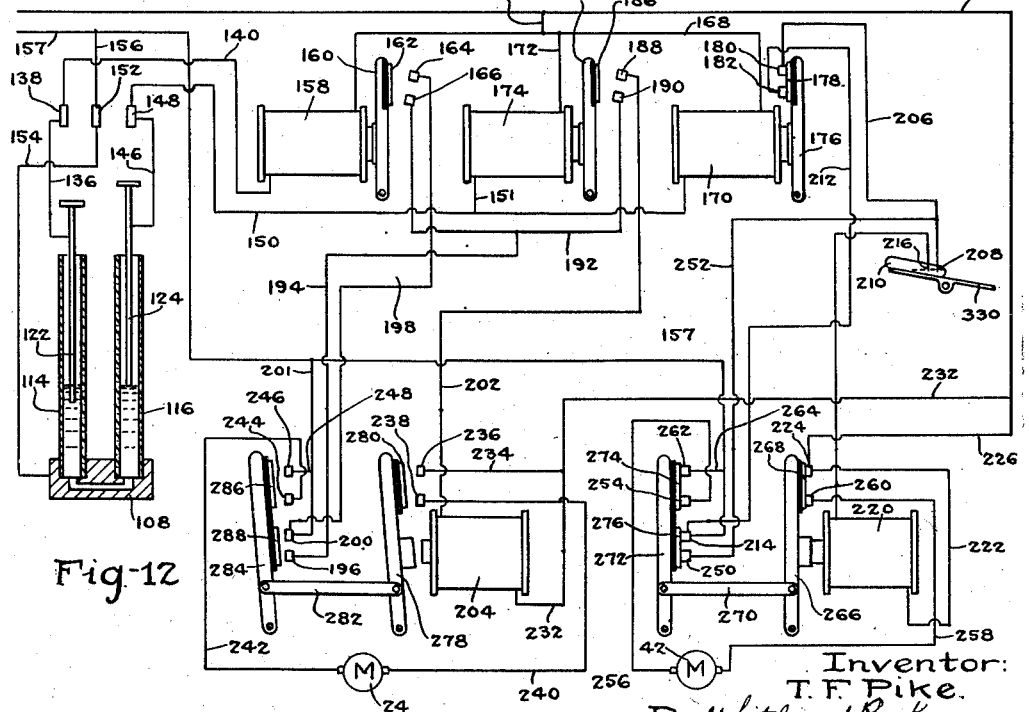
Figure 13:
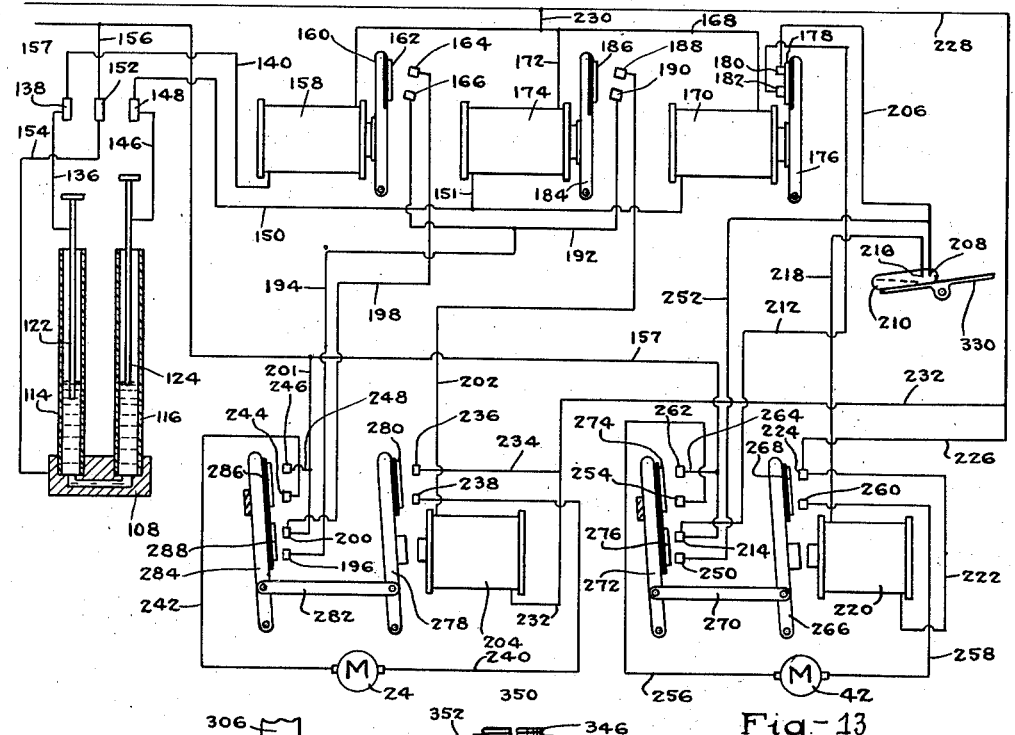
Figure 14:
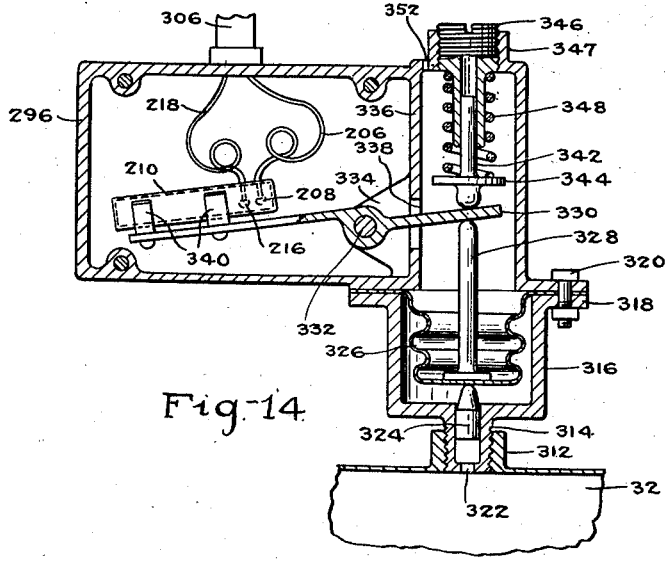
Figure 17:
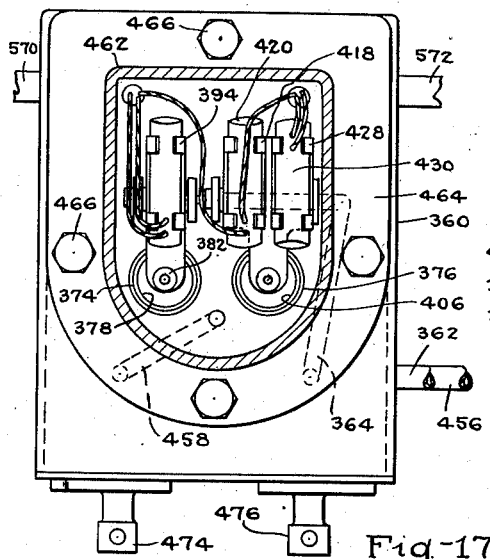
Figure 18:
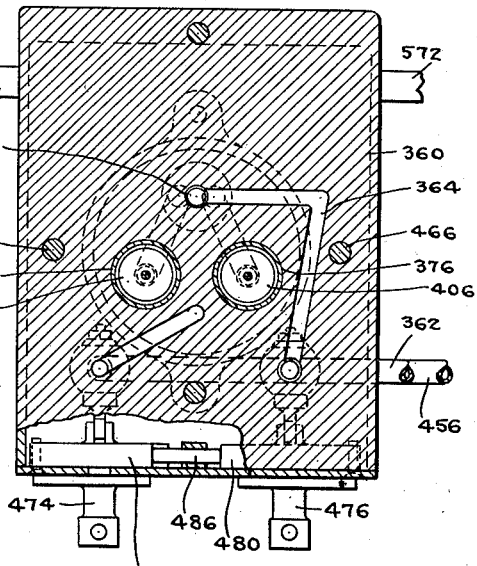
Figure 19:
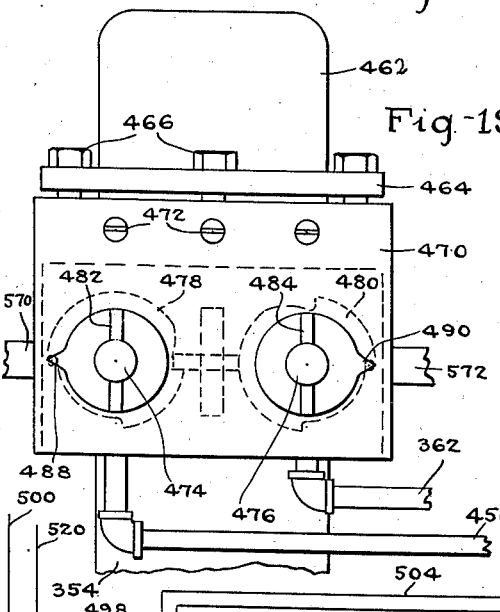
Figure 20:
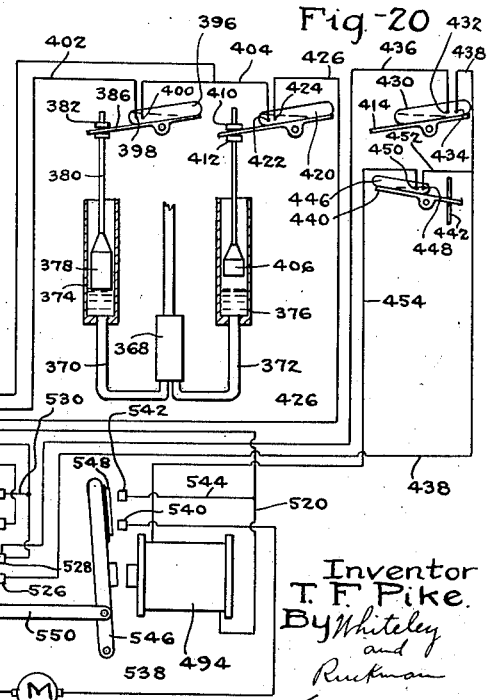

In the accompanying drawings which illustrate two forms in which my invention may be embodied,—Fig. 1 is an elevational view of a system in which my invention is employed. Fig. 2 (Sheet 2) is a view on an enlarged scale showing a mercury column device in vertical section. Fig. 3 is a view in vertical section taken at right angles to Fig. 2. Fig. 4 (Sheet 3) is a view in which the left hand portion is taken in section on the line 4—4 of Fig. 6, and the right hand portion is taken in section on the line 4'—4' of Fig. 8. Fig. 5 is a view similar to the right hand portion of Fig. 4 except that it shows the position of parts for closed valves instead of open valves. Fig. 6 is a view in section on the line 6—6 of Fig. 4. Fig. 7 is a view in section on the line 7—7 of Fig. 4. Fig. 8 is a view in section on the line 8—8 of Fig. 4. Fig. 9 (Sheet 4) is a wiring diagram showing the position of parts when the liquid level in the supply tank is low and the pump for liquid is about to be started. Fig. 10 is a wiring diagram showing the position of parts when the pump for liquid has just been started. Fig. 11 (Sheet 5) is a wiring diagram showing the position of parts after the pump for liquid has operated sufficiently to raise the mercury column into contact with a lower terminal. Fig. 12 is a wiring diagram showing the position of parts when the tank has been filled sufficiently to raise the mercury column into contact with an upper terminal. Fig. 13 (Sheet 6) is a wiring diagram showing the parts in the position which they occupy when the tank has been filled to the desired level and the air pressure in the top of the tank is up to the desired amount. Fig. 14 is a view showing an air pressure switch in vertical section and in open position. Fig. 15 (Sheet 7) is a view showing a modified form of mercury column device and switch devices partly in vertical section and partly in elevation. Fig. 16 is a view partly in vertical section and partly in elevation at right angles to Fig. 15. Fig. 17 (Sheet 8) is a view in section on the line 17—17 of Fig. 15. Fig. 18 is a view in section on the line 18—18 of Fig. 15. Fig. 19 is a front elevational view of the modified form of invention. Fig. 20 is a wiring diagram for the modified form.

Referring to the construction shown in the drawings and first more particularly to Fig. 1, a pump 22 driven by an electric motor 24 draws a liquid such as water from any suitable source of supply through a pipe 26 and delivers it to a pipe 28 leading to any suitable distributing system. A pipe 30 connects the pipe 28 to a storage tank 32, the side of which is provided with a liquid level gauge 34 and the top of which is provided with a safety valve 36. The top of the tank 32 is connected by a pipe 38 with a suitable source of compressed air such as an air compressor 40 adapted to be driven by an electric motor 42. In carrying out my invention, I provide a mercury column device which includes a container 44 closed at its upper end by a head 46 secured by screw bolts 48 to a circumferential flange 50 extending around the upper end of the container as shown in Figs. 2 and 3 which also show the head 46 fastened to any suitable support S by means of a flange 51 carried by the head. One side of the head 46 is connected by a pipe line 52 to the tank 32 below the low water level thereof while the other side of the head 46 is connected to the top of the tank 32 by a pipe line 54. Included in the pipe line 52 is an oil receptacle 56, the top of which is provided with a filling opening closed by a screw plug 58, the bottom of the receptacle 56 being closed by a screw cap 60. As shown in Fig. 4, the pipe line 52 as it enters the receptacle 56 is provided with a downwardly extending portion 62 which stops a little short of the bottom of this receptacle, while the pipe line continues from the top of this receptacle for connection to the head 46. The reason for providing the oil receptacle is because oil is not a conductor of electricity while water is a fairly good conductor.

Included in the pipe line 54, there is an air pressure gauge 64, while included in both the pipe lines 52 and 54, there is an interlocking valve control device which is embodied in connection with a casing 66. The portion of the pipe line 54 within the casing 66 is provided with a valve carried by the inner end of a valve stem 68, this valve stem extending through the casing and being provided at its outer end with a handle 70 by means of which the valve may be turned. Secured to the stem 68 within the casing 66 is a disk 72, a portion of the periphery of which is cut down to provide two shoulders 74 and 76 either one of which may be made to engage with a stop pin 78. The portion of the pipe line 52 within the casing 66 is provided with a valve carried by the inner end of a valve stem 80, this valve stem extending through the casing and being provided at its outer end with a handle 82 as shown in Fig. 1 by means of which this valve may be turned. Secured to the stem 80 within the casing 66 is a disk 84, a portion of the periphery of which is cut down to provide two shoulders 86 and 88 either one of which may be made to engage with a stop pin 90. The peripheries of the disks 72 and 84 are respectively provided with co-related cam portions 92 and 94 between which a short rod 96 is slidably mounted in a plate 98 carried by the casing 66 as shown in Fig. 7. By referring to Fig. 1, it will be seen that the valve stems 68 and 80 are respectively provided with pointers 100 and 102 by means of which the position of the two valves is indicated. Fig. 4 shows the position of the two cams when both valves are in open position while Fig. 5 shows the position of the two cams when both valves are in closed position. By observing the position of the rod 96 in Fig. 4, it is apparent that the valve in the water pipe line 52 must be closed before the valve in the air pipe line 54 can be closed while from Fig. 5 it is apparent that the valve in the air pipe line 54 must be opened before the valve in the water pipe line 52 can be opened. On account of this provision of interlocking valves, it will be understood that the valve in the water pipe line can never be in open position when the valve in the air pipe line is in closed position. If it were not for this provision, the pressure air on top of the water in the storage tank would be apt to force the mercury up out of the mercury column device as will be understood when such device is described in detail.

The mercury column device as shown particularly in Figs. 2, 3, and 4 will now be described. Fig. 4 shows that the pipe line 52 where it connects with said device leads into a passageway 104 from the inner end of which a tube 106 extends downwardly in the container 44, the lower end of this tube being connected with a chamber 106' formed in an angular metallic block or base 108 located near the bottom of the container 44 as shown in Fig. 3. The chamber 106' is connected by means of a passageway 110 with a chamber 112 extending horizontally in the block 108. Tubes 114 and 116 of insulating material extend upwardly from the respective ends of the chamber 112. The upper ends of the tubes 114 and 116 are clamped in openings formed in a bar 118 secured to an intermediate portion of a strip 120 of insulating material extending up from the block 108, the strip 120 stopping short of the upper end of the container 44. The two tubular members 114 and 116 are in communication at their lower ends and therefore in effect constitute part of a U-tube for containing mercury as shown in Fig. 2, it being understood that the mercury fills the chambers in the block 108 and extends part way up in the tube 106, the upper portion of which contains oil supplied from the oil receptacle 56. An adjustable contact rod or terminal 122 is adapted to make contact with the mercury in the tubular member 114 while an adjustable contact rod or terminal 124 whose lower end does not extend down as far as the lower end of the rod 122, is adapted to make contact with the mercury in the tubular member 116 when the level of mercury extends up sufficiently for this purpose. The rods 122 and 124 extend slidably through studs 126 and 128 secured to the strip 120 and held in properly adjusted position by springs 130. The stud 126 is in electrical contact with the lower end of a metallic strip 132 whose upper end engages a binding post 134 carried by the upper end of the insulating strip 120. The post 134 is connected by a short wire 136 with a binding post 138 insulatively carried by the head 46, it being noted that the post 138 is used for securing a wire 140. The stud 128 is in electrical contact with the lower end of a metallic strip 142 whose upper end engages a binding post 144 carried by the upper end of the insulating strip 120. The post 144 is connected by a short wire 146 with a binding post 148 insulatively carried by the head 46, it being noted that the post 148 is used for securing a wire 150 from which a branch wire 151 leads. The head 46 insulatively carries a binding post 152 which is connected by a wire 154 to the metallic block 108. The post 152 is used for securing one end of a wire 156, the other end of which is connected to a feed wire 157 adapted to supply current from any suitable source of electrical energy.

Referring now more particularly to Figs. 9 to 13, it will be noted that the wire 140 is connected to one end of an electromagnet 158 having an armature 160 insulatively carrying a bridge member 162 which when the electromagnet is deenergized bridges two contacts 164 and 166. The other end of the electromagnet 158 is connected by a wire 168 to one end of an electromagnet 170 and by branch wire 172 from the wire 168 with one end of an electromagnet 174. The other ends of the electromagnets 170 and 174 are connected to the wire 150, this connection with the electromagnet 174 being through the branch wire 151. The electromagnet 170 has an armature 176 which insulatively carries a bridge member 178 which when this electromagnet is energized, bridges two contact members 180 and 182. The electromagnet 174 has an armature 184 which insulatively carries a bridge member 186 which when this electromagnet is deenergized, bridges two contacts 188 and 190. The contact 190 is connected by a wire 192 with the contact 166 while the wire 192 is connected by a wire 194 with a contact 196. The contact 164 is connected by a wire 198 with a contact 200 which in turn is connected by a wire 201 with the feed wire 157. The contact 188 is connected by a wire 202 with one end of an electromagnet 204. The contact 180 is connected by a wire 206 with one terminal 208 of a mercury switch having a tube 210 containing mercury and which switch is shown in detail in Fig. 14 and will be described later.

The contact 182 is connected by a wire 212 with a contact 214 to which the feed wire 157 is connected. The second terminal 216 of the mercury switch previously referred to is connected by a wire 218 with one end of an electromagnet 220. The other end of this electromagnet is connected by a wire 222 with a contact 224 which in turn is connected by a wire 226 with a return wire 228. The return wire 228 is connected by a wire 230 with the wire 168 and is also connected by a wire 232 with the second end of the electromagnet 204, the wire 232 being connected by a wire 234 with a contact 236. Adjacent the contact 236 is a contact 238 which is connected by a wire 240 with one side of the pump motor 24, the other side of which is connected by a wire 242 with a contact 244. Adjacent this latter contact is a contact 246 which is connected by a wire 248 to the wire 201 and the feed wire 157. On one side of the contact 214, there is a contact 250 which is connected by a wire 252 to the wire 206. On the other side of the contact 214, there is a contact 254 which is connected by a wire 256 to one side of the compressor motor 42, the other side of which is connected by a wire 258 to a contact 260 which is adjacent the contact 224. Adjacent the contact 254, there is a contact 262 which is connected by a wire 264 to the feed wire 157. The electromagnet 220 has a pivoted armature 266 which insulatively carries a bridge member 268 which when this electromagnet is energized, bridges the two contacts 224 and 260. The armature 266 is connected by a link 270 with a switch arm 272 which insulatively carries two bridge members 274 and 276. When the electromagnet 220 is energized, not only are the contacts 224 and 260 bridged, but the bridge member 274 bridges the contacts 254 and 262 and the bridge member 276 bridges the contacts 214 and 250. The electromagnet 204 has a pivoted armature 278 which insulatively carries a bridge member 280 which when this electromagnet is energized, bridges the two contacts 236 and 238. The armature 278 is connected by a link 282 with a switch arm 284 which insulatively carries two bridge members 286 and 288. When this electromagnet 204 is energized, not only are the contacts 236 and 238 bridged, but the bridge member 286 bridges the contacts 244 and 246 while the bridge member 288 bridges the contacts 196 and 200.

By referring to Fig. 1, it will be understood that the electromagnet 204 which serves as a starter for the pump motor 24 is contained in a box 290, the electromagnet 220 which serves as a starter for the compressor motor 42 is contained in a box 292, the electromagnets 158, 170, and 174 are contained in a box 294 while the mercury switch is contained in a box 296. The wires between the box 290 and the motor 24 are enclosed in a tubular casing 298, the wires between the box 292 and the motor 42 are enclosed in a tubular casing 300, the wires between the box 290 and the box 294 are enclosed in a tubular casing 302, the wires between the box 292 and the box 294 are enclosed in a tubular casing 303, the wires between the box 294 and the mercury column device in the container 44 are enclosed in a tubular casing 304, the wires between the box 294 and the box 296 are enclosed in a tubular casing 306, while the wires connecting the source of electrical supply with the members in the boxes 290 and 292 are enclosed respectively in tubular casings 308 and 310.

The box 296 is mounted on the top of the tank 32 in the manner best shown in Fig. 14. The upper wall of this tank is provided with an internally threaded nipple 312 to receive the externally threaded stem 314 of a hollow member 316 having an upper circumferential flange 318 to which the box 296 is secured by bolts 320. The stem 314 is provided with an entrance opening 322 from the tank 32 and this stem slidably contains a plunger member 324, the upper end of which engages the lower end of a flexible bellowslike member 326 having an out-turned peripheral margin clamped between the box 296 and the hollow member 316. The upper surface of the lower end of the flexible member 326 carries an upwardly extending stem 328 whose upper end engages the lower surface of one end of an arm 330 intermediately pivoted upon a pivot pin 332 held by ears 334 extending out from a vertical partition 336 in the box 296. The arm 330 extends through an opening 338 in the partition 336 and on its end opposite that engaged by the stem 328 is provided with clamping members 340 for holding the tube 210 previously referred to. The upper surface of the arm 330 above the place engaged by the stem 328 is engaged by a plunger 342 carrying a disk portion 344 and having a stem portion adapted to work in the bore of a hollow screw 346 threaded into an internally threaded nipple 347 carried by the top of the box 296. A coiled spring 348 interposed between the head of this screw and the disk 344 tends to move the engaged end of the arm 330 down so that the tube 210 will be in such position that the mercury therein will complete the circuit between the two terminals 208 and 216. However, when the air in the top of the tank 32 is at the desired pressure, the arm 330 is held by this pressure in the canted position shown in Fig. 14 so that the circuit between the two terminals 208 and 216 is broken. The head of the screw 346 contains a slit 350 whereby the screw may be turned to adjust the tension of the spring 348. The top of the box 296 is provided with a perforation 352 which insures that the air in this box shall always be at atmospheric pressure. It is apparent that the device just described constitutes an air pressure switch. The safety valve 36 shown in Fig. 1 prevents the air pressure in the tank 32 from exceeding the desired maximum and this valve may be set to predetermine the maximum pressure.

The operation and advantages of the main form of the invention will be understood in connection with the foregoing description. Fig. 13 shows the normal position of the parts when the tank is filled to approximately the desired level and the air pressure in the top of the tank is up to the desired amount. In this position of parts, current from the supply wire 157 passes through the wire 156, post 152, wire 154, metal base 108, the mercury in the tube 114, the terminal 122, the wire 136, the post 138, the wire 140, the electromagnet 158, the wire 168, and the wire 230 to the return wire 228. The electromagnet 158 is thereby energized and the connection between the contacts 164 and 166 is broken. Current from the supply wire also passes from the metal base 108, through the mercury in the tube 106, the terminal 124, the wire 146, the post 148, the wire 150, the electromagnet 170, the wire 168, and the wire 230 to the return wire 228. The electromagnet 170 is thereby energized and the contacts 180 and 182 are bridged. Current from the wire 150 also passes through the branch wire 151, the electromagnet 174, the wire 172, the wire 168, and the wire 230, to the return wire 228. The electromagnet 174 is thereby energized and the connection between the contacts 188 and 190 is broken. In this position of parts no current will pass through the starting electromagnets 204 and 220.

Assuming that the liquid in the tank 32 has fallen to the lowest desirable extent so that the mercury in the tube 114 does not contact with the terminal 122, no current will flow through the electromagnet 158, and therefore its armature is swung back into the position shown in Fig. 9 thereby bridging the contacts 162 and 164. The mercury in the tube 116 has previously dropped below the level of the lower end of the terminal 124 so that the electromagnet 174 has been de-energized, thereby causing the contacts 188 and 190 to be bridged while the electromagnet 170 has also been de-energized, thereby causing the connection between the contacts 180 and 182 to be broken. Current will now flow from the feed wire 157, through the wire 201, the contact 200, the wire 198, the contact 164, the bridge 162, the contact 166, the wire 192, the contact 190, the bridge 186, the contact 188, the wire 202, the electromagnet 204, and the wire 232 to the return wire 228. The energization of the electromagnet 204 causes both the armature 278 and the arm 284 to swing into the position shown in Fig. 10 so that the contacts 236 and 238 are connected by the bridge 280, the contacts 244 and 246 are connected by the bridge 286, and the contacts 196 and 200 are connected by the bridge 288. Current, therefore, now passes from the feed wire 157 through the wire 201, the wire 248, the contact 246, the bridge 286, the contact 244, the wire 242, the motor 24, the wire 240, the contact 238, the bridge 280, the contact 236, the wire 234, and the wire 232 to the return wire 228. The current passing through the motor 24 causes the pump 22 to operate and start raising the level of liquid in the tank 32.

Fig. 11 shows the position that the parts assume when the level of liquid in the tank 32 has been raised sufficiently to lift the mercury in the tube 114 into contact with the terminal 122. In addition to continuing to flow through the motor 24, current will now flow from the feed wire 157 through the wire 156, post 152, wire 154, base 108, the mercury in the tube 114, the terminal 122, the wire 136, the post 138, the wire 140, the electromagnet 158, the wire 168, and the wire 230 to the return wire 228. The energization of the electromagnet 158 causes its armature 160 to be attracted, thereby breaking the connection between the contacts 164 and 166 and restoring this portion of the device to the original position shown in Fig. 13.

Fig. 12 shows the position that the parts assume when the level of liquid in the tank 32 has been raised sufficiently to lift the mercury in the tube 116 into contact with the terminal 124. In addition to the flow of current just indicated, current will also flow from the base 108 through the mercury in the tube 116, the terminal 124, the wire 146, the post 148, the wire 150, the branch wire 151, the electromagnet 174, the wire 172, the wire 168, and the wire 230 to the return wire 228. The energization of the electromagnet 174 causes its armature 184 to be attracted, thereby breaking the connection between the contacts 188 and 190 and restoring this portion of the device to the original position shown in Fig. 13. Current from the wire 150 also passes through the electromagnet 170, the wire 168, and the wire 230 to the return wire 228. The energization of the electromagnet 170 causes its armature 176 to be attracted and thereby bridge the contacts 180 and 182. If now the rise of liquid in the tank 32 has not restored the pressure of air in the tank to the desired degree, it will be understood that the mercury switch instead of being in the position shown in Figs. 13 and 14 will have the position shown in Figs. 11 and 12 with the terminals 208 and 216 bridged by the mercury in the tube 210. Current will now flow from the feed wire 157 through the contact 214, the wire 212, the contact 182, the bridge 178, the contact 180, the wire 206, the terminals 208 and 216, the wire 218, the electromagnet 220, the wire 222, the contact 224, and the wire 226 to the return wire 228. This energization of the electromagnet 220 causes both the armature 266 and the arm 272 to swing into the position shown in Fig. 12 so that the contacts 224 and 260 are connected by the bridge 268, the contacts 254 and 262 are connected by the bridge 274, and the contacts 214 and 250 are connected by the bridge 276. Current therefore passes from the feed wire 157 through the wire 264, contact 262, bridge 274, contact 254, wire 256, motor 42, wire 258, contact 260, bridge 268, contact 224, and wire 226 to the return wire 228. Current passing through the motor 42 causes the pump 40 to operate for bringing the air in the top of the tank 32 to the desired pressure. As soon as this pressure is obtained as determined by the setting of the screw 346, the tube 210 will be tipped into the position shown in Figs. 13 and 14, thereby breaking the connection between the terminals 208 and 216 and stopping the motor 42. However, if the air pressure should fall at any time before the liquid in the tank 32 falls sufficiently to cause the mercury in the tube 116 to break contact with the terminal 124, then the tube 210 is tipped into the position shown in Fig. 12 and the air compressor is started.

The embodiment of the invention shown in Figs. 15 to 20 on Sheets 7 and 8 of the drawings will now be described. It is to be understood that the system in which this modified construction is used, is similar in a general way to that already described and that in reference to Fig. 20, the motor 24' is employed to operate a pump for maintaining the level of liquid in a storage tank similar to the tank 32 previously referred to and that the motor 42' is employed to operate an air compressor for maintaining the pressure of air in the top of such tank. In carrying out this form of my invention, I provide a mercury column device which includes a casing 354 having an outturned circumferential flange 356 at its upper end. Screws 358 passing through this flange serve to secure a head 360 upon the upper end of the casing 354. A water pipe line 362 leads from the storage tank at a place below the low water level thereof to one end of an angular passageway 364 in the head 360, the other end of this passageway being connected to a tube 366 which extends downwardly and connects into the upper end of a receptacle 368 located in the lower portion of the casing 354. The receptacle 368 contains mercury and at its lower end is connected with two upwardly extending tubes 370 and 372, these tubes together with the receptacle 368 being in the nature of a U tube for containing mercury. The tube 370 extends upwardly through the bottom of a well 374 whose upper end is threaded into an opening extending through the head 360. The tube 372 extends upwardly through the bottom of a well 376 whose upper end is threaded into an opening extending through the head 360. The well 374 contains a float 378 which has an upwardly extending stem 380 to the upper portion of which is secured a pair of spaced collars 382 and 384 between which is positioned one end of an arm 386 intermediately pivoted to ears 388 secured to the upper side of the head 360. A pair of stops 390 and 392 located on opposite sides of the ears 388 serve to limit the extent of rocking movement of the arm 386. Clamps 394 extending up from the arm 386 hold a glass tube 396 containing mercury and one end of which is provided with two terminals 398 and 400. The terminal 398 is connected to a wire 402 while the terminal 400 is connected to a wire 404.

The well 376 contains a float 406 whose lower end is at a higher level than the lower end of the float 378. The float 406 has an upwardly extending stem 408 to the upper portion of which is secured a pair of spaced collars 410 and 412 between which is positioned one end of an arm 414 intermediately pivoted to ears 416 secured to the upper side of the head 360. Stops similar to the stops 390 and 392 serve to limit the extent of rocking movement of the arm 414. Clamps 418 extending up from the arm 414 hold a glass tube 420 containing mercury and one end of which is provided with two terminals 422 and 424. The terminal 422 is connected to the wire 404 while the terminal 424 is connected to a wire 426. The arm 414 also has extending up therefrom clamps 428 which hold a glass tube 430 containing mercury and one end of which is provided with two terminals 432 and 434. A wire 436 is connected to the terminal 432 while a wire 438 is connected to the terminal 434. It will be noted from the diagrammatic construction shown in Fig. 20, that the mercury switches formed by the tubes 420 and 430 operate reversely. That is, when one of them is closed, the other one is open and vice versa. The top of the supply tank is provided with an air pressure switch similar to that shown in Fig. 14. Comparing this figure with the right hand portion of Fig. 20, the arm 330 corresponds to an arm 440, the stem 328 corresponds to a stem 442, the plunger 342 corresponds to a plunger 444, the glass tube 210 corresponds to a glass tube 446, the terminal 208 corresponds to a terminal 448 and the terminal 216 corresponds to a terminal 450. The terminal 448 is connected by a wire 452 with the wire 438 and the terminal 450 is connected to a wire 454.

An air pipe line 456 corresponding to the pipe line 54 shown in Fig. 1 connects the top of the storage tank with a passageway 458 in the head 360, this passageway leading to a chamber 460 above the head 360. This chamber is formed by an airtight cap 462 having an outturned circumferential flange 464 secured by screw bolts 466 to the head 360. It is apparent therefore that the upper surface of the mercury in the wells 374 and 376 is subjected to the pressure of the air in the upper portion of the storage tank.

The form of the invention now being described is provided with an interlocking valve device similar to that shown in Figs. 4, 5, and 8 but is carried directly by the head of the casing 354. The head 360 is provided with a depending flange 468 extending part way around the head while the front of the head is provided with a plate 470 secured thereto by screws 472, the valve stems of this device passing through the plate 470. Comparing Figs. 4, 5, and 8 with Figs. 16 to 19, the valve stems 68 and 80 correspond to valve stems 474 and 476, the cams 72 and 84 correspond to cams 478 and 480, the handles 70 and 102 correspond to handles 482 and 484, the slidable rod 96 corresponds to a slidable rod 486, and the pointers 100 and 102 correspond to pointers 488 and 490.

Comparing Fig. 9 with Fig. 20, it is apparent that the electromagnets 158, 174 and 170 correspond respectively to the mercury switches 396, 420 and 430, and that the electromagnets 204 and 220 correspond to electromagnets 492 and 494 and that the members associated with the electromagnets in one form correspond to similar members associated with the electromagnets in the other form. Referring to Fig. 20, it will be noted that the wire 402 is connected to a contact 496 which is connected by a wire 498 to a feed wire 500. Adjacent the contact 496 is a contact 502 which is connected by a wire 504 with the wire 402. The wire 498 is connected by a branch wire 506 to a contact 508. Adjacent the contact 508 is a contact 510 which is connected by a wire 512 to one side of the motor 24', the other side of which is connected by a wire 514 to a contact 516. The wire 426 is connected to one side of the electromagnet 492, the other side of which is connected by a wire 518 to a return wire 520, the wire 518 being connected by a wire 522 to a contact 524 located adjacent the contact 516. The wire 438 is connected to a contact 526. Adjacent the contact 526 is a contact 528 to which the feed wire 500 is connected, the wire 436 also being connected to the contact 528. The fed wire 500 is also connected by a wire 530 to a contact 532. Adjacent the contact 532 is a contact 534 which is connected by a wire 536 to one side of the motor 42', the other side of this motor being connected by a wire 538 to a contact 540. Adjacent the contact 540 is a contact 542 which is connected by a wire 544 to the return wire 520, the latter being connected to one end of the electromagnet 494. The wire 454 is connected to the other end of the electromagnet 494.

The electromagnet 494 has a pivoted armature 546 which insulatively carries a bridge member 548 which when the electromagnet is energized bridges the two contacts 540 and 542. The armature 546 is connected by a link 550 with a switch arm 552 which insulatively carries two bridge members 554 and 556. When the electromagnet 494 is energized, not only are the contacts 540 and 542 bridged, but the bridge member 554 bridges the contacts 532 and 534 and the bridge member 556 bridges the contacts 526 and 528. The electromagnet 492 has a pivoted armature 558 which insulatively carries a bridge member 560 which when this electromagnet is energized, bridges the two contacts 516 and 524. The armature 558 is connected by a link 562 with a switch arm 564 which insulatively carries two bridge members 566 and 568. When the electromagnet 492 is energized, not only are the contacts 516 and 524 bridged, but the bridge member 566 bridges the contacts 508 and 510 and the bridge member 568 bridges the contacts 496 and 502. The wires entering the cap 462 at one side for connection with the mercury switches therein are enclosed in a tubular casing 570 while the wires entering at the other side for connection with the mercury switches are enclosed in a tubular casing 572.

The operation and advantages of the embodiment of the invention just described will now be readily understood. Fig. 20 shows the position of parts when the liquid in the storage tank has fallen to the lowest desirable extent. The mercury in the well 374 has now fallen thereby causing the float 378 to lower and rock the tube 396 and thereby bridge the terminals 398 and 400. The mercury in the well 376 has previously dropped sufficiently to lower the float 406, thereby rocking the tubes 420 and 430 so as to bridge the terminals 422 and 424 and at the same time disconnecting the terminals 432 and 434. Current will now flow from the feed wire 500 through the wire 498, the contact 496, the wire 402, the terminals 398 and 400, the wire 404, the terminals 422 and 424, the wire 426, the electromagnet 492 and the wire 518 to the return wire 520. The energization of the electromagnet 492 causes both the armature 558 and the arm 564 to swing so that the contacts 516 and 524 are connected by the bridge 560, the contacts 496 and 502 are connected by the bridge 568, and the contacts 508 and 510 are connected by the bridge 566. Current will therefore now pass from the feed wire 500 through the wire 498, the wire 506, the contact 508, the bridge 566, the contact 510, the wire 512, the motor 24', the wire 514, the contact 516, the bridge 560, the contact 524, the wire 522, and the wire 518 to the return wire 520. The current passing through the motor 24' causes the pump to operate and start raising the level of liquid in the storage tank. As the liquid in such tank continues to rise, the passage of current can be traced in the same manner as set forth in connection with the first embodiment of the invention described. If the pressure of air in the top of the storage tank is too low, then the terminals 448 and 450 of the air pressure switch will be bridged by the mercury in the tube 446 and the compressor motor 42' will be started in the same manner as previously described.

The operation and advantages of my invention have to a large extent already been set forth. In both forms of the invention disclosed herein, when the water reaches its high level in the tank, if the air pressure is low, then the pressure switch is in closed position. When the switch device which stops the water pump operates, it closes a starting circuit for the air compressor and the air compressor will continue to operate until the air pressure in the tank is built up to its predetermined setting at which time the pressure switch will open and stop the air compressor. If at the time when the water reaches its high level, there is the predetermined air pressure in the tank, then the pressure switch will be opened and when the switch device which stops the water pump operates, the air compressor will not start. Among the advantages of this system is the fact that it is impossible for very much air to leak out since the air compressor is ready to start each time that the water reaches its high level, and this being the case, a very small air compressor will maintain proper air balance in any size of tank, which results in a lower cost of installation and a more even pressure. So far as I am aware, this is the only system which will accurately and automatically maintain both the air pressure and the water volume within a compression tank.

I claim:

1. In a hydro-pneumatic control apparatus, the combination of a tank, a pump for supplying liquid to said tank, an air compressor connected to the top of said tank, a mercury column device in the nature of a U-tube, a pipe line connecting one end of said column with the lower portion of said tank, a second pipe line connecting the other end of said column with the upper portion of said tank, valves in said pipe lines respectively, interlocking means between said valves which prevents the valve in said first pipe line from being in open condition when the valve in said second pipe line is in closed condition, and means set in operation by changes in the height of said mercury column for causing said pump to operate when the liquid in said tank falls to a predetermined level and for causing said pump to stop when the liquid in said tank rises to a predetermined level.

2. In a hydro-pneumatic control apparatus, the combination of a tank, means for supplying liquid to said tank, a source of compressed air connected to the top of said tank, a mercury column device in the nature of a U-tube, a pipe line connecting one end of said column with the lower portion of said tank, a second pipe line connecting the other end of said column with the upper portion of said tank, valves in said pipe lines respectively, interlocking means between said valves which prevents the valve in said first pipe line from being in open condition when the valve in said second pipe line is in closed condition, and means set in operation by changes in the height of said mercury column for causing said liquid supplying means to stop when the liquid in said tank rises to a predetermined level.

3. In a hydro-pneumatic control apparatus, the combination of a tank, a pump for supplying liquid to said tank, an electric motor for driving said pump, an air compressor connected to the top of said tank, an electric motor for driving said air compressor, a mercury column device in the nature of a U-tube, a pipe line connecting one end of said column with the lower portion of said tank, a second pipe line connecting the other end of said column with the upper portion of said tank, valves in said pipe lines respectively, interlocking means between said valves which prevents the valve in said first pipe line from being in open condition when the valve in said second pipe line is in closed condition, switch devices set in operation by changes in the height of said mercury column for supplying current to said pump motor when the liquid in said tank falls to a predetermined level and for cutting off the current from said motor when the liquid in said tank rises to a predetermined level, and an air pressure switch connected to the top of said tank for controlling said air compressor motor to maintain a predetermined air pressure in said tank.

4. In a hydro-pneumatic control apparatus, the combination of a tank, means for supplying liquid to said tank, means for automatically maintaining the liquid in said tank between predetermined maximum and minimum levels, an air compressor connected for delivering air to said tank, a motor for driving said air compressor, an arm intermediately pivoted at the upper end of said tank, means for subjecting one end of said arm to force exerted upwardly by the pressure in said tank, means for holding said end downwardly when the pressure is lower than a predetermined pressure, a switch associated with the other end of said arm and closed only when the first mentioned end is in downward position, and connections between said switch and motor which cause the latter to be operated only when said switch is in closed position.

THEODORE F. PIKE.